July 5, 1955
A. R. SEARS
2,712,212
ROTARY GRASS RAKE
Filed May 13, 1954
3 Sheets-Sheet 1
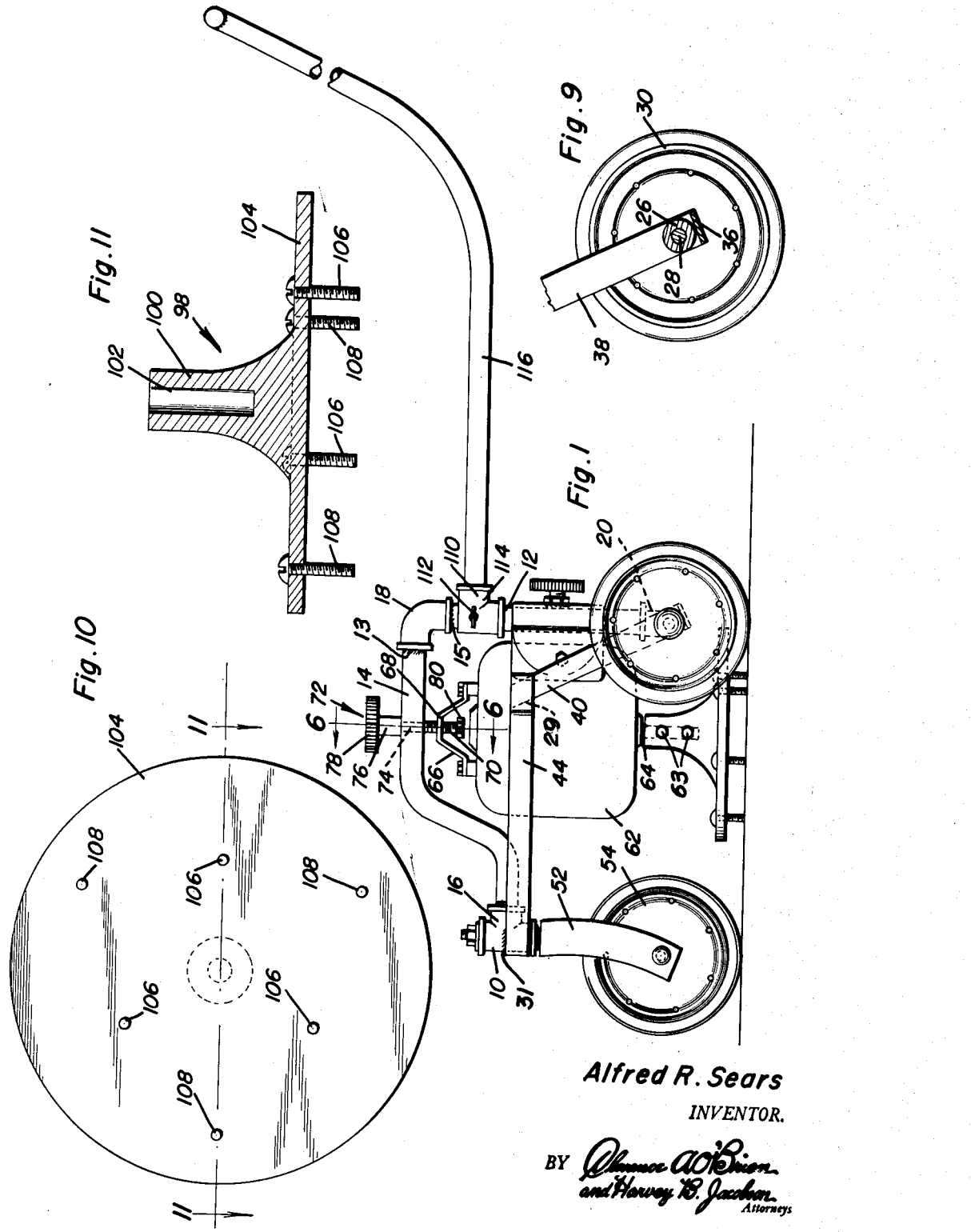
Alfred R. Sears
INVENTOR.

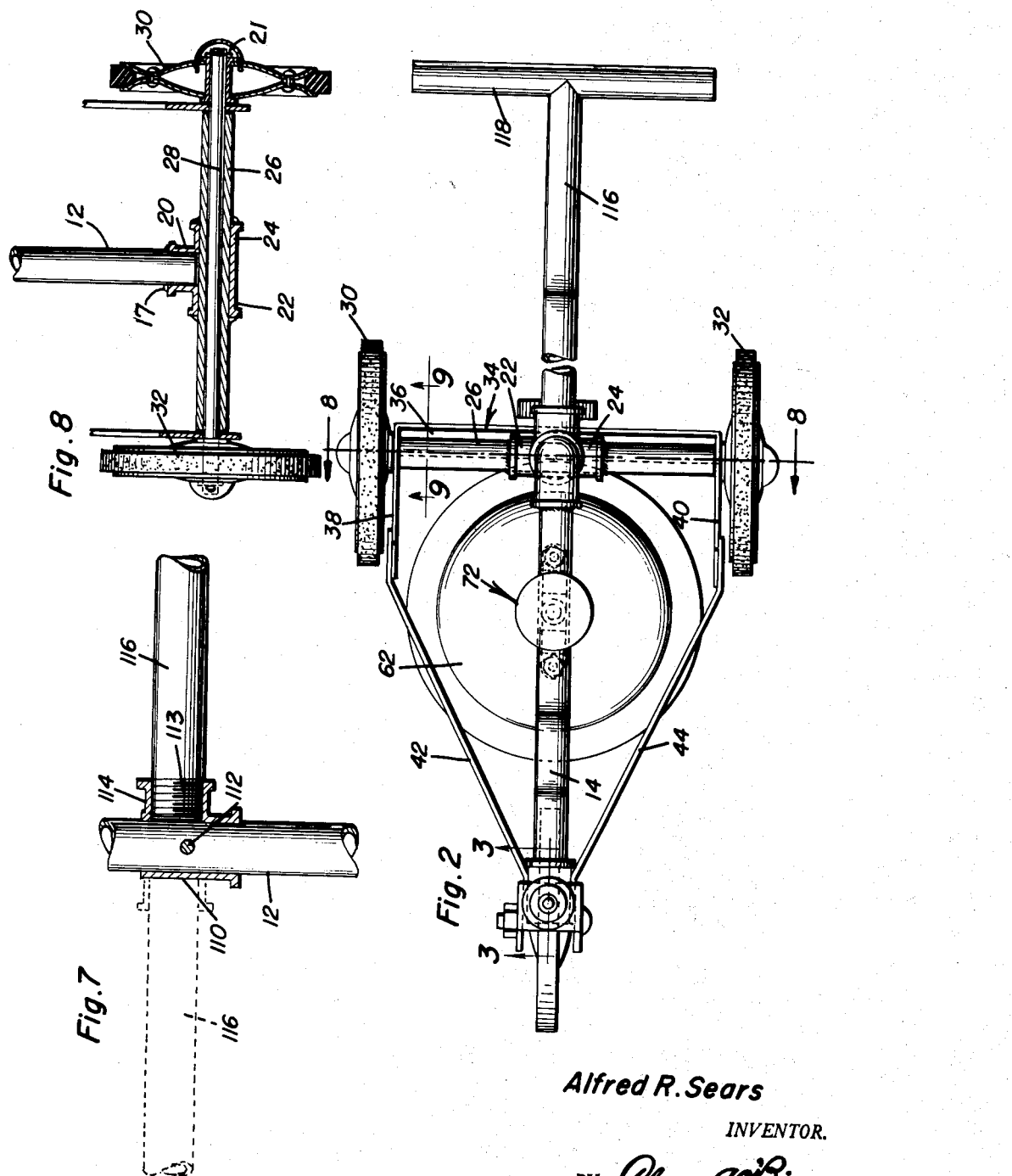

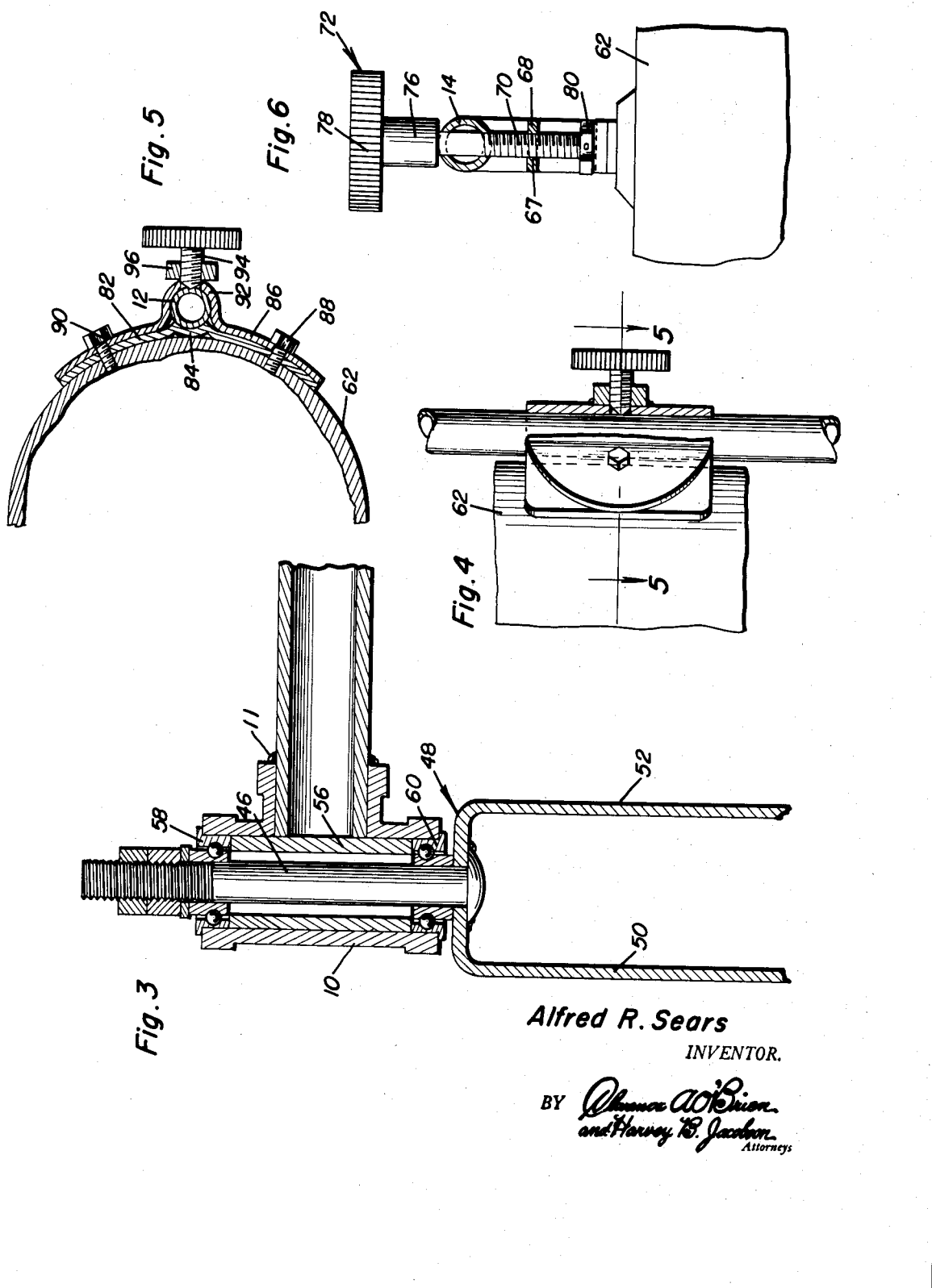

United States Patent Office 2,712,212
Patented July 5, 1955

2,712,212
ROTARY GRASS RAKE
Alfred R. Sears, Coronado, Calif.

Application May 13, 1954, Serial No. 429,666

1 Claim. (Cl. 56—27)

This invention relates generally to rake structures, and has for its primary object the provision of an improved rotary rake mechanism particularly beneficial in positioning low lying vegetaion in upright relation such that the vegetation may be subsequently cut by a lawn mower.

A primary object of this invention is to provide an improved rotary rake construction which incorporates a novel frame assembly for quickly and easily supporting the drive assembly for vertical adjustment thereon so as to control the depth of penetration of the rake teeth.

Another object of this invention is to provide an improved rotary rake which incorporates the provision of a more efficient form of rake wheel assembly wherein the teeth are disposed thereon in a novel and improved manner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the improved rotary rake assembly;

Figure 2 is an enlarged plan view of the assembly shown in Figure 1;

Figure 3 is an enlarged vertical section taken substantially along the plane of section line 3—3 in Figure 2;

Figure 4 is an enlarged fragmentary elevational view of the motor guide assembly;

Figure 5 is a horizontal section taken substantially along the plane of section line 5—5 in Figure 4;

Figure 6 is an enlarged vertical section taken substantially along the plane of section line 6—6 in Figure 1;

Figure 7 is a fragmentary elevational view partly in section showing the improved handle construction;

Figure 8 is a fragmentary vertical longitudinal section taken through the axle assembly on the line 8—8 of Figure 2;

Figure 9 is a vertical section taken substantially along the plane of section line 9—9 in Figure 2;

Figure 10 is an enlarged plan view of the rake disk assembly; and

Figure 11 is a transverse section taken substantially along the plane of section line 11—11 in Figure 10.

Referring now more particularly to the drawings, the frame of the machine will be seen to consist of a front upright member 10 and a rear upright member 12 which are interconnected by the longitudinal generally horizontal member 14. In this respect, it will be noted that the upright member 10 is in the form of a pipe T with its stem portion 16 disposed horizontally and receiving one and the other end of the member 14, welded thereto, as it is also to be noted that the upper end of the upright 12 is provided with an elbow fitting 18 receiving the upper end of the upright 12 welded thereto, as at 13, and the other end of the number 14, welded thereto, as at 15. It is intended that all portions of the frame are to be constructed of conventional and standard pipe fittings and pipe sections.

The lower end of the upright 12 carries a T-fitting 20 welded thereto, as at 17, and whose oppositely extending horizontal leg portions 22 and 24 receive an elongated tubular axle receiving member 26 which forms a journal for the axle member 28 having the wheel members 30 and 32 secured, as at 21, at opposite ends thereof. A generally U-shaped brace member 34 has its bight portion 36 disposed in parallelism with the member 26 and its opposed legs 38 and 40 are inclined upwardly and forwardly for connection, at 29, with the horizontally disposed rearwardly diverging brace straps 42 and 44, respectively, the forward ends of these straps being rigidly connected by welding, as at 31, to the upright 10.

As seen most clearly in Figure 3, the upright receives a vertical spindle member 46 which is secured at its lower end by welding 22 to the fork 48 whose bifurcated legs 50 and 52 straddle the wheel member 54 to effect a castering action at the front end of the machine. A suitable spacer sleeve 56 is disposed within the upright 10 and bearing members 58 and 60 are associated therewith for effecting a vertical pivot axis for the fork 48.

An electric motor 62 is disposed within the confines of the frame such that its drive shaft 64 is disposed vertically, and it is to be noted that the upper end of this motor is provided with a bracket 66 whose central portion 68 is threaded, as at 67 to receive the threaded end portion 70 of an adjusting member, indicated generally by the reference character 72. The adjusting member 72 has its shank portion 74 projecting vertically through and journaled within the frame member 14 and an enlarged portion 76 of this shank provides a thrust collar for supporting the motor 62 and the adjusting member is provided with an enlarged knurled head 78 for ease of manipulation. The lower end of the threaded portion 70 is provided with a stop nut 80 to limit the downward adjustment of the motor 62.

To guide the motor 62 in its vertical adjustment and prevent rotation of the motor assembly, the mechanism shown most clearly in Figures 4 and 5 of the drawings is utilized. This mechanism incorporates a plate member 82 arcuately formed to fit the casing of the motor 62, and having a trough portion 84 receiving a peripheral portion of the upright 12 and further incorporates a second plate member 86 overlying the first and secured therewith to the motor casing by means of suitable fasteners 88 and 90. The second plate member incorporates a trough portion 92 engaging and embracing that portion of the upright 12 opposite the trough portion 84, and this trough portion carries a suitable setscrew member 94 and associated lock nut 96 to lock the vertical adjustment of the motor once the same has been effected.

The lower end of the drive shaft 64 has secured thereto by bolts 63 a rake disk assembly, indicated generally by the reference character 98 which includes a hub 100 having a recess 102 therein receiving the drive shaft and a circular plate portion 104. As shown most clearly in Figures 10 and 11, there are two series of rake teeth 106 and 108 secured to the plate portion 104 in depending relation thereto. Preferably, these rake teeth take the form of steel screws threadedly engaged through the plate 104 and it is to be noted that the teeth 106 are disposed at spaced points along the circumference of an inner circle on the plate 104 and that the rake teeth 108 are disposed at spaced points along the surface of an outer circle on the plate 104. These teeth 106 and 108 are disposed in such relationship that any two adjacent teeth are disposed on circles of different radii.

The upright 12 is provided with a special elbow fitting 110 which is rotatable thereon but is normally held against rotation by the setscrew member 112 and the horizontal leg 114 of this fitting has threaded therein, as at 113, one end of the handle assembly 116 which is utilized in manipulating the rig. The free end of the handle is, of course, provided with a horizontal hand grip portion 118. For the purpose of storage or transportation, the setscrew 112 may be loosened and the handle swung from the full to the dotted line position shown in Figure 7.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A rotary grass rake comprising, a frame having a pair of front and rear spaced uprights, a horizontal tubular member secured at its midsection to the lower end of the rear uprights and extending transversely thereof, an axle journaled in said tubular member, a pair of wheels secured to opposite ends of said axle, a caster wheel carried by the front upright, a longitudinal connecting member secured at opposite ends to said uprights, a motor, screw feed means mounting said motor on said longitudinal member in underslung position between said uprights and for vertical adjustment and with its armature shaft depending therefrom vertically, a pair of opposed guide plates fixed to said motor and conformably and slidably fitting opposite sides of said rear upright for guiding the motor in its vertical adjustment, a U-shaped brace member mounted on said axle with a portion parallel to said horizontal tubular member and ends inclining upwardly and forwardly at opposite sides of the motor, a pair of horizontal straps having corresponding ends fixed to opposite sides of the front upright and diverging rearwardly with the other ends thereof fixed to said ends of the brace member, and a rotary rake head fixed on said shaft.

References Cited in the file of this patent

UNITED STATES PATENTS

| | | |
|---|---|---|
| 2,485,984 | Newman | Oct. 25, 1949 |
| 2,577,264 | Oppegaard | Dec. 4, 1951 |
| 2,588,599 | Winter | Mar. 11, 1952 |